Patented Jan. 4, 1949

2,458,328

UNITED STATES PATENT OFFICE 2,458,328

2(4,4'BIS DIMETHYLAMINOBENZOHYDRYL)5 DIMETHYLAMINOBENZOIC ACID

Clyde S. Adams, Yellow Springs, Ohio, assignor to The National Cash Register Company, Dayton, Ohio, a corporation of Maryland No Drawing. Application June 16, 1945, Serial No. 599,968

1 Claim. (Cl. 260—391)

This invention relates to the new compound 2(4,4'bis dimethylaminobenzohydryl)5 dimethylaminobenzoic acid, having the structure

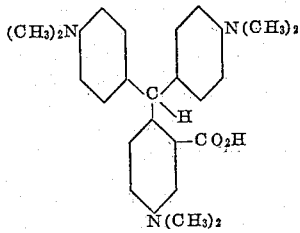

The novel compound has a melting point of approximately 199–200 degrees centigrade and crystallizes from hot benzene in gray crystals.

The compound is valuable as an intermediate oxidizable substance in the making of compounds color-responsive to weak acids and to adsorbed polar solids. Specifically, it may be oxidized into Crystal Violet Lactone, having the formula 3,3 bis(4 dimethylaminophenyl)6 dimethylamino phthalide, having the structure

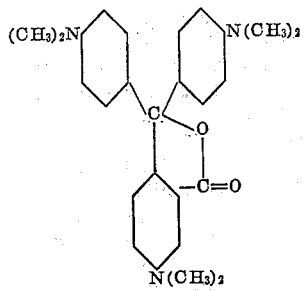

which is normally colorless but which assumes a blue color in the presence of weak acids or when adsorbed on polar solid substances such as clay. This latter oxidation is fully shown in my co-pending application for United States Letters Patent Serial No. 599,967, filed June 16, 1945, which issued as United States Letters Patent No. 2,417,897.

The novel compound may be prepared by condensing Michler's Hydrol, having the structure

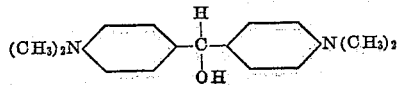

with m-dimethylaminobenzoic acid, having the structure

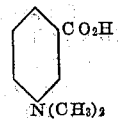

Michler's Hydrol may be obtained commercially, as it is an important intermediate in the dyestuff industry, but m-dimethylaminobenzoic acid is not obtainable even for laboratory use, so a method of its preparation will be given.

*Preparation of m-dimethylaminobenzoic acid*

The m-dimethylaminobenzoic acid may be made by the methylization of m-aminobenzoic acid, having the structure

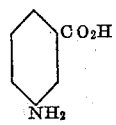

using methyl iodide in the presence of an aqueous solution of potassium hydroxide. The m-aminobenzoic acid is obtainable commercially, but at present only in small amounts. It is, however, a well-known compound. The first step in the preparation of m-dimethylaminobenzoic acid is to produce its betain. Seventy grams of m-aminobenzoic acid is dissolved in 700 milliliters of 50% methyl alcohol, using a two-liter flask fitted with a cork. The resulting mixture may be warmed to effect complete solution. To the solution, when cooled, is added 225 grams of methyl iodide, followed by the addition of 105 grams of 85% potassium hydroxide, which is the approximate strength of the ordinary commercial C. P. product, in three separate charges of 35 grams each, each 35-gram charge being previously dissolved in 100 cc. of 50% methyl alcohol. The first charge is introduced into the flask, which is stoppered and permitted to stand at room temperature until a test shows that the solution is acid. The second and third charges are added successively, the timing of the third charge, as in the case of the second charge, awaiting the event of the acid condition of the solution. The solution is allowed to stand until the disappearance of the methyl iodide which forms a separate layer at the bottom of the flask. This period of methylation usually requires from three to five days.

The contents of the flask are now subjected to distillation until most of the methyl alcohol has been distilled over. The remaining aqueous solution is cooled, and 75 milliliters of concentrated hydrochloric acid (37% gas content by weight) is added. On standing and cooling, white crystals of the hydrated hydriodic acid salt of m-trimethylbenzbetaîn separate out. These crystals are filtered off and air dried.

The betaîn, which has the structure

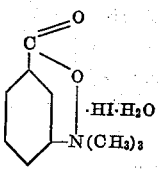

is next converted to the methyl ester of m-dimethylaminobenzoic acid in the following manner. Enough of the betaîn prepared in accordance with the preceding step to make 100 grams is placed in a wide-mouthed Erlenmeyer flask immersed in an oil bath. The temperature is gradually raised to a point at which the betaîn begins to melt and decompose, giving off gaseous hydrogen iodide and water vapor. The temperature slowly climbs to a point at which the decomposition is completed. The decomposition should be carried on slowly and carefully to prevent loss of product by entrainment. A light oil, which is essentially the free betaîn, remains in the flask. The temperature of the oil is then raised to 235 degrees centigrade for approximately fifteen minutes, during which the transition of the betaîn to the corresponding ester takes place. The ester, having the formula

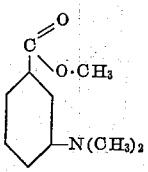

is then cooled and solidifies to a wax-like solid.

The ester prepared in the preceding step is then saponified in the following manner. Sixty-four grams of the waxy methyl ester of m-dimethylaminobenzoic acid is dissolved in a solution made of 100 milliliters of concentrated hydrochloric acid and 100 milliliters of water. The resulting solution is boiled for five minutes to saponify the ester. The hot acid solution of m-dimethylaminobenzoic acid should be treated with activated charcoal and boiled for a few minutes longer to decolorize it. The resulting mixture is filtered hot. The residual activated charcoal is washed with a small quantity of hot water while still on the filter, and the washings are added to the main filtrate.

Next, m-dimethylaminobenzoic acid is isolated from the resulting acid solution. The acid solution of m-dimethylaminobenzoic acid is cooled and partially neutralized with a cold saturated solution of sodium hydroxide. Final neutralization is accomplished by adding sodium carbonate solution as long as the precipitate, which first forms, redissolves on stirring. The resulting solution is then treated with a saturated solution of sodium acetate prepared by dissolving 60 grams of hydrated sodium acetate in 50 milliliters of water. The resulting mixture is allowed to cool, and the resulting crystals of m-dimethylaminobenzoic acid are filtered off, washed with a small quantity of cold water, and air dried. This crude air-dried product may be further purified by recrystallizing it from its solution in hot benzene.

*Condensation of Michler's Hydrol with m-dimethylaminobenzoic acid*

The condensation reaction may be written as follows:

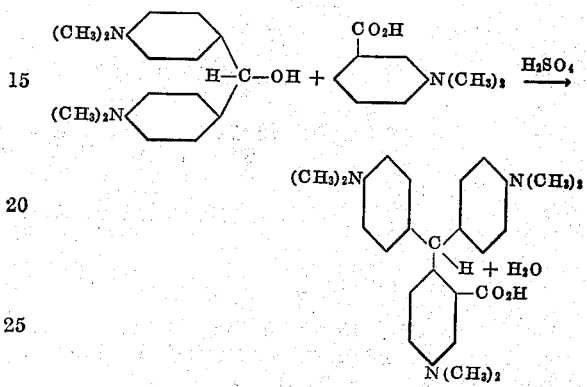

As an example, 18 grams of m-dimethylaminobenzoic acid crystals is mixed and powdered with 27 grams of Michler's Hydrol. The resulting intimate mixture is then added very slowly to 212 grams of 90% sulphuric acid which has been previously cooled to zero degrees centigrade by an ice bath. The sulphuric acid is mechanically stirred during the addition of the mixture. After addition of the mixture, the resulting solution is allowed to stand at room temperature for several hours. The brown acid solution is then poured slowly onto 1,000 grams of ice. The resulting dilute acid solution is then partially neutralized, while being stirred, with a strong sodium hydroxide solution, followed by more precise neutralization accomplished by adding sodium carbonate solution as long as the precipitate, which first forms, redissolves on stirring. Two hundred grams of solid hydrated sodium acetate is then added, the solution being constantly stirred. The resulting mixture is permitted to stand several hours in a cool place. The cooled mixture is filtered to recover the solid condensation products, which are washed on the filter with water and thereafter redissolved in a minimum quantity of dilute hydrochloric acid.

The resulting dilute hydrochloric acid solution of the condensation products is neutralized with a sodium hydroxide solution, excess being added to make the solution definitely alkaline. The alkaline solution should be boiled for a few minutes, cooled, and filtered. The alkaline filtrate, containing the sodium salt of 2(4,4'bis dimethylaminobenzohydryl) 5-dimethylaminobenzoic acid, is acidified with acetic acid, care being taken not to add much excess acetic acid after the solution becomes acid. The free novel compound—namely, 2(4,4'bis dimethylaminobenzohydryl)-5-dimethylaminobenzoic acid—crystallizes out from the acid solution on cooling and standing. This novel compound is filtered off and dried in a desiccator over a drying substance such as Drierite. The dried novel compound is re-crystallized from a hot benzene solution. The resulting gray crystals of 2(4,4'bis dimethylaminophenyl) 1-dimethylaminobenzoic acid, having a melting point of 199–200 degrees centigrade are filtered off, washed with petroleum ether, and air dried.

What is claimed is:

The compound 2(4,4'bis dimethylaminobenzohydryl) 5-dimethylaminobenzoic acid, having the structure

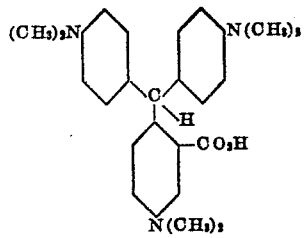

CLYDE S. ADAMS.

REFERENCES CITED

The following references are of record in the file of this patent:

UNITED STATES PATENTS

| Number | Name | Date |
| --- | --- | --- |
| 2,130,480 | Austin | Sept. 20, 1938 |

OTHER REFERENCES

Fischer, Annalen der Chemie, vol. 206, p. 101 (1880).

Haller et al., Bull. Soc. Chimique de Paris, (3), vol. 25, p. 317 (1901).

Cain et al., "Synthetic Dyestuffs" (1920), pages 97 to 98.

Certificate of Correction

Patent No. 2,458,328.

January 4, 1949.

CLYDE S. ADAMS

It is hereby certified that error appears in the printed specification of the above numbered patent requiring correction as follows:

Column 4, line 72, for "1-di-" read $5$-$di$-;

and that the said Letters Patent should be read with this correction therein that the same may conform to the record of the case in the Patent Office.

Signed and sealed this 24th day of May, A. D. 1949.

[SEAL]

THOMAS F. MURPHY,
*Assistant Commissioner of Patents.*